United States Patent
Lessley et al.

(10) Patent No.: US 10,766,041 B2
(45) Date of Patent: Sep. 8, 2020

(54) FLOW DIVERTER IN FLUID APPLICATION DEVICE

(71) Applicant: Illinois Tool Works Inc., Glenview, IL (US)

(72) Inventors: Mel Steven Lessley, Villa Hills, KY (US); Edward W. Bolyard, Jr., Old Hickory, TN (US)

(73) Assignee: Illinois Tool Works Inc., Glenview, IL (US)

( * ) Notice: Subject to any disclaimer, the term of this patent is extended or adjusted under 35 U.S.C. 154(b) by 447 days.

(21) Appl. No.: 14/969,254

(22) Filed: Dec. 15, 2015

(65) Prior Publication Data

US 2016/0184842 A1   Jun. 30, 2016

Related U.S. Application Data

(60) Provisional application No. 62/096,732, filed on Dec. 24, 2014.

(51) Int. Cl.
  *B05B 1/30*    (2006.01)
  *B05C 11/10*    (2006.01)
  (Continued)

(52) U.S. Cl.
  CPC .............. *B05B 1/30* (2013.01); *B05B 1/16* (2013.01); *B05C 5/027* (2013.01);
  (Continued)

(58) Field of Classification Search
  CPC ....... B05B 1/30; B05C 5/0241; B05C 5/0245; B05C 5/027; B05C 5/0279;
  (Continued)

(56) References Cited

U.S. PATENT DOCUMENTS

| 3,192,562 A | * | 7/1965 | Powell | D01D 5/30 250/396 R |
| 3,979,907 A | * | 9/1976 | Paul | B66F 9/22 60/422 |

(Continued)

FOREIGN PATENT DOCUMENTS

| CN | 1541779 A | 11/2004 |
| CN | 202366843 U | 8/2012 |

(Continued)

OTHER PUBLICATIONS

International Search Report issued by ISA/EP in connection with PCT/US2015/066982 dated Mar. 23, 2016.

*Primary Examiner* — Alex M Valvis
(74) *Attorney, Agent, or Firm* — Levenfeld Pearlstein, LLC

(57) ABSTRACT

A fluid application device having a flow diverter is provided. The fluid application device includes an applicator head having an internally formed manifold having a fluid input conduit, two or more fluid output conduits and a chamber disposed between the input conduit and the two or more output conduits. An external attachment surface is formed on the applicator head and is configured to have two or more nozzles selectively and removably secured thereto. A flow diverter is removably disposed in the chamber and includes a plug having two or more channels, each channel in fluid communication with the fluid input conduit and a respective fluid output conduit of the two or more output conduits. The fluid input conduit is configured to receive a fluid from a supply source and the two or more fluid output conduits are configured to discharge the fluid from the applicator head to respective nozzles.

4 Claims, 4 Drawing Sheets

(51) Int. Cl.
*B05C 5/02* (2006.01)
*B05B 1/16* (2006.01)
*F16K 11/02* (2006.01)

(52) U.S. Cl.
CPC .......... *B05C 11/1044* (2013.01); *F16K 11/02* (2013.01); *B05C 5/0241* (2013.01); *B05C 5/0279* (2013.01)

(58) Field of Classification Search
CPC ..... B05C 11/1044; F16K 5/04; F16K 5/0407; F16K 5/0421; F16K 5/0471; F16K 5/18; F16K 5/181; F15B 13/0807; F15B 13/0814; F15B 13/0871; F15B 13/0892; F15B 13/0896; F15B 2013/006
USPC ........ 137/101, 561 A, 625.48, 625.15, 625.5
See application file for complete search history.

(56) References Cited

U.S. PATENT DOCUMENTS

| | | | |
|---|---|---|---|
| 4,011,887 A * | 3/1977 | Raymond | F15B 13/0807 137/880 |
| 5,750,159 A | 5/1998 | Delmore et al. | |
| 5,988,214 A * | 11/1999 | Tajima | F15B 13/0402 137/596 |
| 8,061,379 B2 * | 11/2011 | Inaba | F15B 13/0839 137/271 |
| 8,551,562 B2 | 10/2013 | McGuffey | |
| 2004/0261696 A1 * | 12/2004 | Ackerman | B05C 5/0275 118/200 |
| 2012/0073282 A1 * | 3/2012 | Schleicht | F15B 1/26 60/459 |

FOREIGN PATENT DOCUMENTS

JP  2005313170 A  11/2005
WO  2015153384 A1  10/2015

* cited by examiner

FLOW DIVERTER IN FLUID APPLICATION DEVICE

BACKGROUND

The following description relates to a flow diverter for diverting fluid flow to different modules in a fluid application device for discharging or applying a fluid, for example, onto a substrate or strand of material.

Nonwoven fabrics are engineering fabrics that provide specific functions such as absorbency, liquid repellence, resilience, stretch, softness, strength, flame retardant protection, easy cleaning, cushioning, filtering, use as a bacterial barrier and sterility. In combination with other materials, nonwoven materials can provide a spectrum of products with diverse properties and can be used alone or as components of hygiene apparel, home furnishings, health care, engineering, industrial and consumer goods.

An adhesive application device includes one or more nozzles configured to discharge an adhesive onto a substrate, such as a nonwoven fabric. In some configurations, the nozzle may discharge the adhesive onto one or more strands of the elasticated material, and the elasticated material may then be bonded to the substrate. In other configurations, the nozzle may discharge the adhesive directly onto the substrate. The nozzle includes a plurality of outlets through which the adhesive may be discharged.

The adhesive application device may include an applicator head configured to receive the adhesive from a supply. The one or more nozzles are secured to the applicator head and configured to receive the adhesive from the applicator head. The applicator head includes an input conduit through which the adhesive is received from the supply. The input conduit may split into multiple output conduits, each output conduit configured to deliver the adhesive a respective nozzle.

Conventionally, the output conduits of the applicator head are manufactured to deliver an equal volume of the adhesive to each nozzle. That is, the total volume received in the input conduit may be equally distributed among the output conduits over a period of time, for subsequent delivery to respective nozzles.

However, in some applications, the number of outlets on the different nozzles may vary or the flow from each outlet may need to vary. In such a scenario, a flow rate of the adhesive discharged from the outlets of the different nozzles may vary. For example, where one nozzle includes two outlets and another nozzle includes four outlets, and the outlets of the first and second nozzles are formed of the same dimensions, an equal volume received at each nozzle results in a flow rate from each outlet of the two-outlet nozzle that is double that of the flow rate from each outlet of the four-outlet nozzle. The differences in the flow rates of the adhesive discharged from the nozzles may lead to inconsistent adhesive application properties or patterns across the different strands.

In some configurations, the flow rate or volume of adhesive may be individually metered by installing respective pumps at each output conduit. However, this configuration requires excess components that may be difficult to manipulate, expensive to produce and time consuming to install and/or remove.

Accordingly, it is desirable to provide a fluid application device having a modular flow diverter that may be installed and removed as a unit to meter or control a volume of fluid delivered to different nozzles.

SUMMARY

According to one embodiment, there is provided a flow diverter for a fluid application device. The flow diverter includes a plug configured for removable insertion in an applicator head between a fluid input conduit and two or more fluid output conduits, the plug comprising two or more channels, each channel in fluid communication with the fluid input conduit and a respective fluid output conduit of the two or more output conduits.

According to another embodiment there is provided a fluid application device including an applicator head having a manifold internally formed therein, the manifold including a fluid input conduit, two or more fluid output conduits and a chamber disposed between and fluidically connecting the fluid input conduit and the two or more fluid output conduits. The fluid application device further includes an external attachment surface on the applicator head configured to have two or more nozzles selectively and removably secured thereto, each nozzle configured to receive the fluid from a respective fluid output of the two or more fluid outputs, and a flow diverter removably disposed in the chamber, the flow diverter formed as a plug having two or more channels, each channel in fluid communication with the fluid input conduit and a respective fluid output conduit of the two or more output conduits. The fluid input conduit is configured to receive a fluid from a supply source and the two or more fluid output conduits are configured to discharge the fluid from the applicator head to respective nozzles.

Other objects, features, and advantages of the disclosure will be apparent from the following description, taken in conjunction with the accompanying sheets of drawings, wherein like numerals refer to like parts, elements, components, steps, and processes.

DETAILED DESCRIPTION

Figure 1:
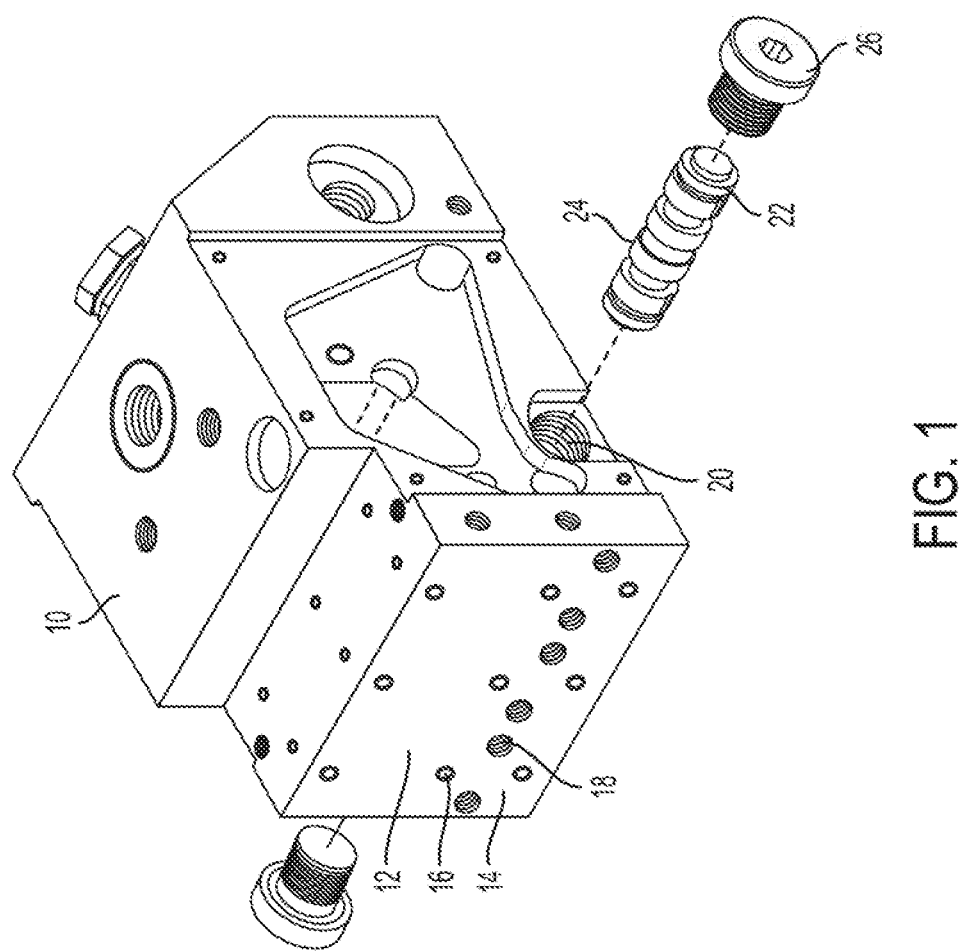
FIG. 1 is a perspective view of an applicator head for use in a fluid application device according to an embodiment described herein.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

FIG. 1 is a perspective view of an applicator head 10 for use in a fluid application device 11 (see FIG. 4) according to an embodiment described herein. The applicator head 10 includes an external attachment surface 12 configured to have one or more nozzles (not shown) removably and interchangeably secured thereto. In one embodiment, the attachment surface 12 includes one or more attachment areas 14, each attachment area 14 configured to have a respective nozzle secured thereto. Each attachment area 14 may include, for example, at least one discharge outlet 16 configured to discharge a fluid from the applicator head 10 to the nozzle, and at least one fastening bore 18, each fastening bore 18 configured to receive a fastener (not shown) to removably and interchangeably secure a nozzle to the applicator head.

The applicator head 10 further includes a chamber 20 configured to receive a fluid flow diverter 22. In one embodiment, the fluid flow diverter 22 may be removably and interchangeably received in the chamber 20. As further described below with reference to FIG. 3, the fluid flow diverter 22 may be formed as a plug having two more externally formed fluid flow channels 24. One or more retainers 26 may be used to secure the fluid flow diverter 22 in the chamber 20. In one embodiment, the one or more retainers 26 may be formed as screw plugs. However, it is understood that the present disclosure is not limited to this example.

Figure 2:
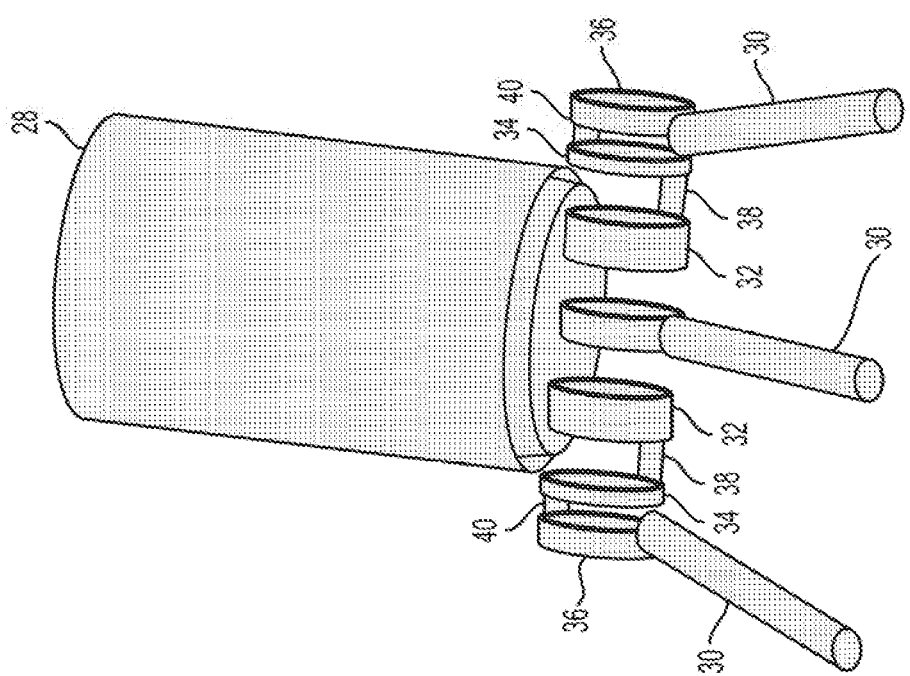
FIG. 2 is a model showing a flow path of the fluid within the applicator head of FIG. 1, according to an embodiment described herein.

FIG. 2 is a model showing a flow path of the fluid within the applicator head 10, according to an embodiment described herein. Referring to FIGS. 1 and 2, the applicator head 10 includes an internally formed manifold having a fluid input conduit 28 and two or more fluid output conduits 30. The chamber 20 is disposed between the fluid input conduit 28 and the two or more fluid output conduits 30 and fluidically connects the fluid input conduit 28 to the two or more fluid output conduits 30. The fluid input conduit 28 is configured to receive the fluid from the supply source. Each fluid output conduit 30 terminates at respective discharge outlet 16 at the attachment surface 14 to discharge the fluid from the applicator head 10 to a respective nozzle. In one embodiment, the manifold, i.e., the fluid flow paths within the applicator head 10, includes the input conduit 28 and three output conduits 30. However, it is understood the present disclosure is not limited to this embodiment, and the number of fluid input conduits 28 and fluid output conduits 30 may vary.

Figure 3:
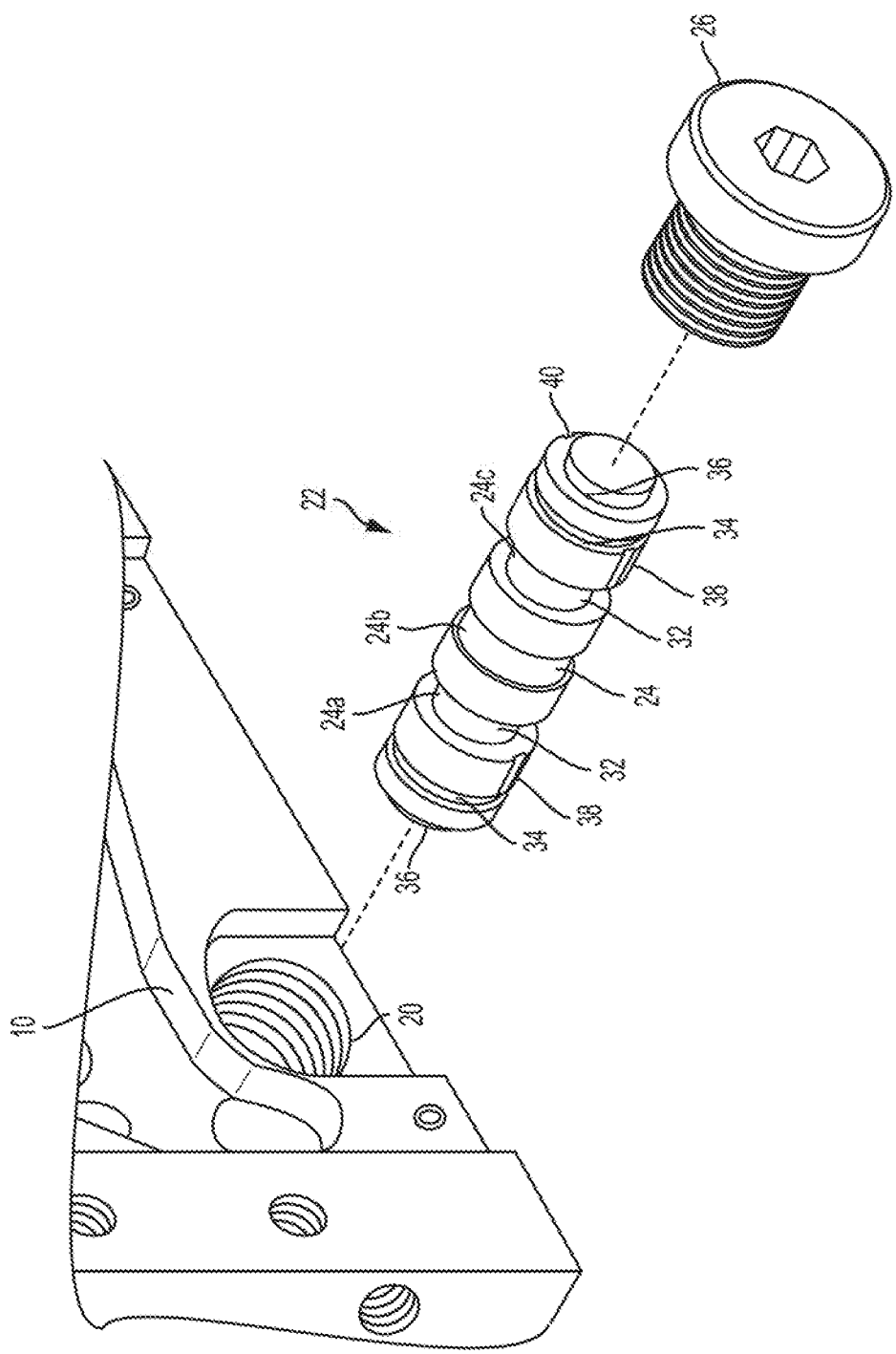
FIG. 3 is an enlarged perspective view showing the fluid flow diverter shown in FIG. 1.

FIG. 3 is an enlarged perspective view of the fluid flow diverter 22 shown in FIG. 1. Referring to FIGS. 1 and 3, in one embodiment, the fluid flow diverter 22 is formed in a generally cylindrical shape. The fluid flow channels 24 may be formed as recessed grooves in an outer surface of the diverter 22, extending in a substantially circumferential direction of the diverter 22. The fluid flow channels 24 are formed in the diverter 22 to control a volume of fluid flowing therethrough. That is, the fluid flow channels 24 may be formed with predetermined dimensions to control a volume of fluid flowing into respective fluid output conduits 30. For example, a fluid flow channel 24 may be formed with a width and/or depth suitable for allowing a predetermined volume of fluid to flow therethrough. Accordingly, different fluid flow channels 24 in the diverter 22 may be formed to allow for different volumes of fluid to flow therethough.

Referring to the examples in FIGS. 1-3, the fluid flow diverter 22 may be formed with a number of fluid flow channels 24 that corresponds to the number of fluid output conduits 30 in the applicator head 10, with each fluid flow channel 24 in fluid communication with a respective fluid output conduit 30. However, it is understood that the present disclosure is not limited to this configuration.

In one embodiment, the fluid flow diverter 22 includes three fluid flow channels formed in its outer surface: a first channel 24a, a second channel 24b and a third channel 24c. Each channel 24a, 24b, 24c corresponds to, and is in fluid communication with a respective fluid output conduit 30 of the applicator head 10. The fluid flow channels 24 may be formed to allow a predetermined volume of fluid to flow therethrough. In one embodiment, at least one of the fluid flow channels 24 may be formed to allow a different volume of fluid to flow therethrough than the other fluid flow channels. For example, as shown in FIG. 3, the second channel 24b may be formed to allow a greater volume of fluid to flow therethrough than the first and third channels 24a, 24c.

As best shown in FIGS. 2 and 3, in one embodiment, the first and third channels 24a, 24c may be formed having multiple flow sections. For example, each of the first and third channels 24a, 24c may include three circumferentially extending flow sections 32, 34, 36. The circumferentially extending flow sections 32, 34, 36 of each of the first and third flow channels 24a, 24c may be fluidically connected to another by an axially extending connecting channel. For example, a first axially extending connecting channel 38 may connect a first circumferentially extending flow section 32 to a second circumferentially extending flow section 34, and a second axially extending connecting channel 40 may fluidically connect the second circumferentially flow section 34 to a third circumferentially extending flow section 36. The third circumferentially extending flow section 36 may be axially bounded on one side by a portion of the diverter 22 and on another side the retainer 26.

In one embodiment, the first axially extending connecting channel 38 is positioned 180 degrees apart from the second axially extending connecting channel 40. That is, the first axially extending connecting channel 38 and second axially extending connecting channel 40 may be on diametrically opposite sides of the diverter 22. The first axially extending connecting channel 38 may be formed having a depth less than that of the first circumferentially extending flow section 32. In addition, the second axially extending connecting channel 40 may be formed having a depth less than that of the third circumferentially extending flow section 36. In one embodiment, the respective depths of the first and second axially extending flow sections 38, 40 may equal to a depth of the second circumferentially extending flow section 34.

One or more nozzles (not shown) may be releasably secured to the applicator head 10 at the attachment surface 12. For example, a nozzle may be releasably secured at each attachment area 14. Each nozzle is in fluid communication with a respective fluid output conduit 30 via a respective discharge outlet 16. Each nozzle includes one or more orifices for discharging the fluid, for example, onto a material or a substrate. In one embodiment, three nozzles may be releasably secured to the applicator head 10 at the attachment surface 12. The number of orifices on each nozzle may vary. For example, a first nozzle and third nozzle may include 2 orifices, while a second nozzle between the first and third nozzles may include four orifices. Thus, the first and third nozzles may each discharge two fluid strands or fibers for application onto the substrate or strands of material, while the second nozzle discharges four fluid strands or fibers for application onto the substrate or strands of material. However, it is understood that the present disclosure is not limited to this configuration. For example, one or more of the nozzles may be replaced with another nozzle having a different number of orifices for discharging the fluid. The one or more nozzles may be, for example, a contact nozzle, a non-contact nozzle, a non-contact nozzle with air assist, a die and shim nozzle, or include a combination thereof.

In the embodiments above, the diverter 22 may be constructed such that a volume of fluid flowing through each flow channel 24 of the diverter 22 to a respective nozzle corresponds to the number of orifices on each nozzle, such that the flow rate at each orifice of each nozzle is substantially the same. That is, the diverter 22 may control the volume of fluid delivered to each nozzle such that a ratio of the volume of fluid delivered to the nozzle to the number of orifices at the nozzle is equal across all nozzles secured to the applicator head. Thus, in these embodiments, a diverter 22 may be formed to correspond with a desired arrangement of nozzles. That is, the diverter 22 may be formed based on the number of orifices of each nozzle and the location, or order, on the applicator head 10 where the nozzles are positioned.

For example, in one embodiment, a first nozzle and a third nozzle may each have two orifices for discharging the fluid, and a second nozzle, positioned between the first and third nozzles may have four orifices for discharging the fluid. Accordingly, the diverter 22 may be configured to divert half of the fluid flow, by volume, from the input conduit 28 to the output conduit 30 that is in fluid communication with the second nozzle, as the second nozzle includes one half of the total number of orifices among the three nozzles. Similarly, the diverter 22 is also configured to divert one quarter of the fluid flow to each of the first nozzle and the third nozzle. In this embodiment, the second channel 24*b* is dimensioned to receive one half of the fluid flow from the input conduit 28 and direct this flow to the output conduit in fluid communication with the second nozzle. Similarly, the first and third channels 24*a*, 24*c* may each be dimensioned to receive and direct one quarter of the fluid flow from the input conduit 28 to respective output conduits 30 in fluid communication with respective first and third nozzles.

In one embodiment, the fluid flow diverter 22 is formed as a modular unit. That is, the fluid flow diverter 22 may be removed and replaced with another fluid flow diverter that may have, for example, differently dimensioned fluid flow channels 24 to direct a different volume of fluid to the output conduits 30. Thus, different fluid flow diverters 22 may be interchangeably disposed in the applicator head 20 for use with different nozzle and orifice configurations, such that a proportional volume of fluid is diverted to each nozzle, based on the number of orifices of each nozzle. Accordingly, a flow rate of the fluid discharged from each orifice may be equal or substantially equal across all orifices of the one or more nozzles.

Conversely, the channels 24 of the fluid flow diverter 22 may be configured to divert a non-proportional volume of fluid, relative to the number of orifices on the nozzles, to one or more of nozzles in applications where it may be desired to different flow rates of the fluid discharged from the orifices of different nozzles. Thus, in the embodiments shown in FIGS. 1-3 and described above, the fluid flow diverter 22 may meter the fluid to be delivered to different nozzles by way of the fluid flow channels 24.

In the embodiments above, the applicator head 10 may be configured so there are fewer nozzles secured to the applicator head 10 than there are channels 24 in the fluid flow diverter 22 and output conduits 30 in the applicator head 10. In this scenario, any output conduits 30 or channels 24 that do not have a nozzle secured in fluid communication therewith may be plugged so that fluid flow is directed to the channels 24 and output conduits 30 that are in fluid communication with a respective nozzle.

Figure 4:
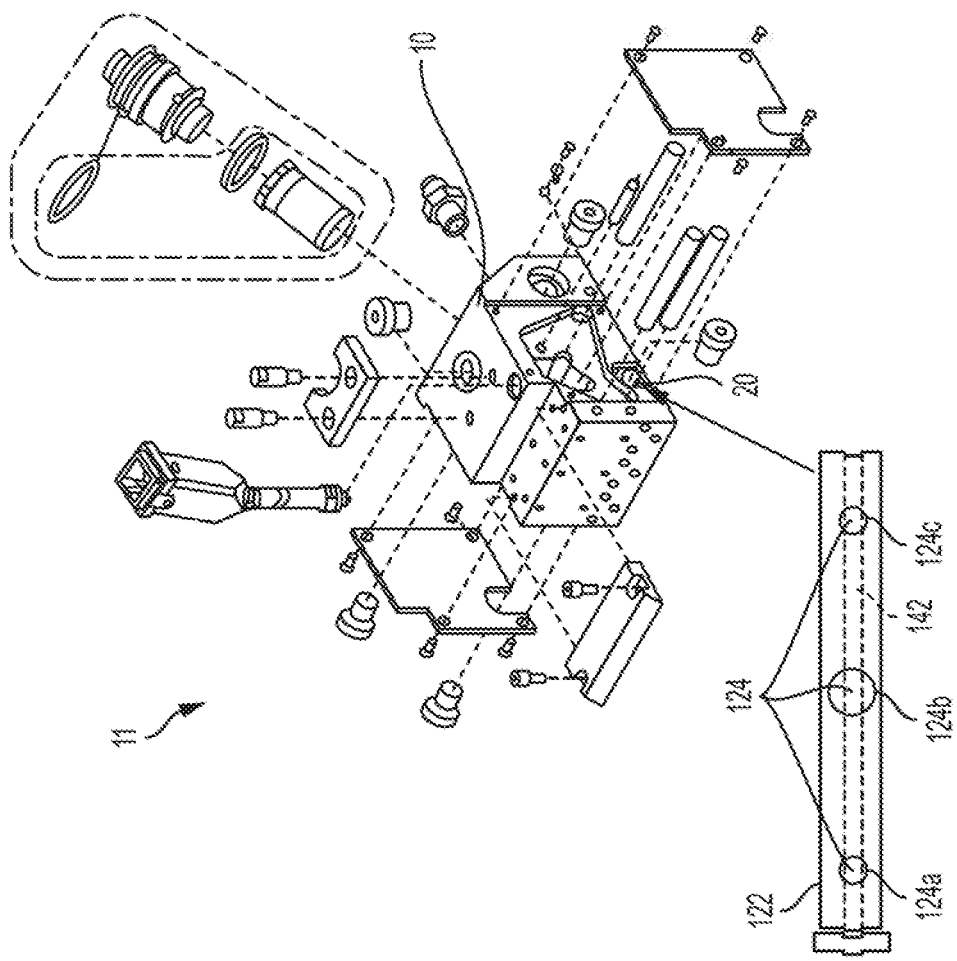
FIG. 4 is an exploded view and diagram showing an applicator head having a fluid flow diverter according to another embodiment described herein.

FIG. 4 is an exploded view and diagram showing an applicator head 10 having a fluid flow diverter 122 according to another embodiment described herein. It is understood like reference characters and terminology may refer to features described in the embodiments above that are similar or identical in this embodiment. Accordingly, further description may be omitted below. It is also understood that references to and further description of features described in the embodiments above may be omitted below where the features above are similar or identical to the features in the embodiment below.

Referring to FIG. 4, the fluid flow diverter 122 may be formed as a plug and received in the chamber 20 of the applicator head 10 of the fluid application device 11. The diverter 122 may include two or more fluid flow channels 124. The fluid flow channels 124 may be formed as discrete internal channels 124. In addition, the fluid flow diverter 122 may include a common channel 142 upstream from, and in fluid communication with each of the internal channels 124. The common channel 142 is configured to receive the fluid from the input conduit 28 and the two or more internal channels 124 are configured to receive the fluid from the common channel 142. In one embodiment, the common channel 142 and two or more internal channels 124 may be formed and extend within the diverter 122. For example, the common channel 142 may be internally disposed in the diverter 122 and receive the fluid from the input conduit via an inlet. Alternatively, the common channel 142 may be formed as an open slot that is open along at least a portion of its lengths to receive the fluid from the input conduit 28. In another embodiment, the fluid flow diverter 122 may be dimensioned to provide for a space between a portion of the chamber 20 and an upstream facing side of the diverter 122. Such a space may be in fluid communication with each of the internal channels 124, and thus, may serve as the common channel 142.

A volume of the fluid flow to be delivered to each nozzle, via respective output conduits 30, may be determined or controlled by the dimensions of the internal channels 124 of the diverter 122. For example, an internal channel 124 formed with a larger diameter may allow for a greater volume of fluid flow to be delivered to a nozzle than an internal channel with a smaller diameter (relative to the larger diameter internal channel 124). Accordingly, a proportional volumetric flow may be diverted and delivered to each nozzle via the internal channels 124 based on a number of orifices at each nozzles. Thus, a discharge flow rate may be substantially equal at all orifices across the different nozzles.

For example, in one embodiment, the fluid flow diverter 122 may include first, second and third internal channels 124*a*, 124*b*, 124*c*. The internal channels 124*a*, 124*b*, 124*c* are configured to allow for a predetermined volumetric fluid flow to pass therethrough and be discharged to a respective nozzle. As shown in FIG. 4, different volumetric fluid flows may be accommodated by forming the internal channels 124 with different diameters. For example, the second internal channel 124*b* may have the largest diameter of the internal channels and thus, allow the largest volume of fluid to be fed to the second nozzle. In one example, the second internal channel 124*b* may allow approximately 60% of the fluid to pass therethrough, while 20% of the fluid passes through the first and third internal channels 124*a*, 124. That is, three times the amount of fluid, by volume, may be directed through the second internal channel 124*b* compared to the first and third internal channels 124*a*, 124*c*. Thus, where the second nozzle includes three times the number of orifices as the first and third nozzles, and the orifices are similarly formed, the fluid may be discharged from the orifices of the three nozzles at substantially the same flow rate.

It is understood that the present disclosure is not limited to this configuration. For example, fluid flow diverter 122 may include any number of internal channels, preferably corresponding to the number of nozzles removably secured to the applicator head 10. Similarly, the applicator head 10 may include a number of fluid output conduits that corresponds the number of nozzles secured to the applicator head 10. It is understood, however, that in some configurations, there may be fewer nozzles secured to the applicator head 10 than there are internal channels 124 in the fluid flow diverter 122 and output conduits 30 in the applicator head 10. In this scenario, any output conduits 30 or internal channels 124 that do not have a nozzle secured in fluid communication therewith may be plugged so that fluid flow is directed to the internal channels 124 and output conduits 30 that are in fluid communication with a respective nozzle.

In the embodiments described herein, the fluid may be a viscous fluid that is a liquefied material heated or non-heated between about 10 and 50,000 centipoise (cps). The fluid may be, for example, an adhesive, including but not limited to a hot melt adhesive. The flow diverter described in the embodiments above may be used in an environment or application where it is desirable to separate flow to and from a particular module or zone, such as a nozzle, while using only a single pump to feed a fluid to multiple modules. For example, the diverter described herein may be used in a configuration where there are four modules (for example, four nozzles) and a single pump supplies fluid to the four modules. The diverter may be configured to provide 1× flow to the outer modules and 2× flow to the inner modules, for example.

In one embodiment, the fluid application device 11 may be part of a strand coating system, and in particular, a high speed strand coating system. In a strand coating system, strands of material are fed by one or more nozzles and coated with an adhesive discharged from one or more nozzles. The strands may then be boned to an underlying substrate, such as a nonwoven material. In other embodiment, the fluid application device 11 may be part of a contact or slot-die coating application, where the fluid is applied directly or indirectly to a substrate, such as, but not limited to, a nonwoven material or a packaging material. However, it is understood that the flow diverter described herein is not limited to use described in the examples above. For example, the flow diverter described herein may also, or alternatively, be used with fluid application devices and/or nozzles in construction and/or laminating applications.

It should also be understood that various changes and modifications to the presently disclosed embodiments will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A flow diverter for a fluid application device, the flow diverter comprising:
a plug configured for removable insertion in an applicator head between a fluid input conduit and two or more fluid output conduits, the plug comprising two or more channels, each channel in fluid communication with the fluid input conduit and a respective fluid output conduit of the two or more output conduits, the two or more channels formed on an exterior surface of the plug,
wherein each channel of the two or more channels is fluidically separated from each other channel of the two or more channels on the plug,
wherein at least one channel of the two more channels includes a plurality of circumferential flow sections and an axially extending connecting channel fluidically connecting the plurality of circumferential flow sections, and
wherein the plurality of circumferential flow sections includes at least a first circumferential flow section and a second circumferential flow section disposed axially outward relative to the first circumferential flow section on the plug, and wherein the second circumferential flow section is configured to receive the fluid from the first circumferential flow section via the axially extending connecting channel.

2. The flow diverter of claim 1, wherein one of the two or more channels is configured to allow a different volume flow rate than another of the two or more channels.

3. The flow diverter of claim 1, wherein the two or more channels include a first, second and third channel.

4. The flow diverter of claim 3, wherein the second channel is positioned between the first channel and the third channel, and at least one of the first channel, second channel and third channel are configured to provide a different volume flow rate than the other of the first channel, second channel and third channel.

\* \* \* \* \*